United States Patent [19]

Astle

[11] 3,988,553

[45] Oct. 26, 1976

[54] LIGHTING CONTROL

[75] Inventor: Thomas W. Astle, Orange, Conn.

[73] Assignee: Michael J. Cozy, Waterbury, Conn.

[22] Filed: May 9, 1974

[21] Appl. No.: 468,420

[52] U.S. Cl. .......................... 200/38 BA; 74/568 T; 200/33 B; 200/153 LB; 200/308

[51] Int. Cl.[2] .................. H01H 43/00; F16H 53/00; H01H 9/00

[58] Field of Search ............ 200/33 R, 38 F–38 FB, 200/38 BA, 51 R, 51.02, 51.1, 51.11, 153 L, 153 LB, 297, 123, 27 R, 30 R, 31 R, 38 B, 38 CA, 153 T, 284, 308, 42–45, 316; 307/40, 114, 141, 139; 174/66; 339/122 R, 123; 74/568 R, 568 T

[56] References Cited

UNITED STATES PATENTS

| | | | |
|---|---|---|---|
| 2,239,130 | 4/1941 | Trimberger et al. | 200/45 |
| 2,545,719 | 3/1951 | Wedeberg | 74/568 T X |
| 2,903,528 | 9/1959 | Kuhn | 200/38 BA |
| 2,920,152 | 1/1960 | Werner | 200/27 R |
| 2,978,553 | 4/1961 | Bundy et al. | 200/27 R |
| 3,033,949 | 5/1962 | Hehl | 74/568 T X |
| 3,372,708 | 3/1968 | Hotchkin | 74/568 X |
| 3,483,344 | 12/1969 | Hermle | 200/38 BA |
| 3,569,992 | 3/1971 | Papa, Jr. et al. | 200/38 BA |
| 3,678,225 | 7/1972 | Hulterstrum | 200/38 BA |
| 3,729,612 | 4/1973 | Schmale | 200/284 |
| 3,846,597 | 11/1974 | Ziegler, Jr. | 200/31 R X |
| R28,249 | 11/1974 | Estrem | 200/31 R X |

*Primary Examiner*—James R. Scott
*Attorney, Agent, or Firm*—DeLio and Montgomery

[57] ABSTRACT

A remote lighting control for box mounted lamps which permits one or more wall switch controlled lamps to be operated on a selected time basis by creating a circuit across the normally opened wall mounted switches.

2 Claims, 10 Drawing Figures

LIGHTING CONTROL

This invention relates to devices for controlling electric lighting, and more particularly relates to such control devices for use in conjunction with lights which are already controlled by a wall-mounted switch.

Many devices are available for predetermining a lighting cycle of a free-standing lamp. Such devices generally comprise timer-controlled contacts which when actuated will close a switch between a wall receptacle and a lamp for a predetermined time, or on a predetermined cycle. Such devices are generally used to illuminate areas of a residence and give the appearance of human presence when, in fact, the house is vacant.

However, at the present time, no devices are available or have been proposed which will readily permit the automatic control of wall or ceiling mounted fixtures, or outdoor post lamps which are controlled through a wall-mounted switch box.

Accordingly, the present invention provides a switching device and a new and improved wall-mounted switch which allows fixtures mounted to their own outlet box and having no switch to be controlled for a predetermined cycle.

Briefly stated, the invention in one form thereof comprises a combined wall switch and plate therefor having terminals across the switch contacts which permits the manual switch to be left in a normally open position, but which will complete a circuit across the normally open switch terminals to illuminate a lamp normally controlled by such switch. The invention further comprises a timing device which includes at least one timing cam driven by a synchronous timing motor and which will close a switch across the contacts of the manual switch at predetermined intervals of time. A wall box embodying the invention includes a receptacle for a conductor leading from the timing device.

An object of this invention is to provide a new and improved timing control for lamps which are controlled from a wall box mounted switch.

Another object of this invention is to provide a new and improved timing device for the operation of a plurality of lamps.

A further object of this invention is to provide a new and improved combination of wall box mounted switch and remote timer control therefor.

The features of the invention which are believed to be novel are particularly pointed out and distinctly claimed in the concluding portion of this specification. However, the invention both as to its organization and operation, together with further objects and advantages thereof, may best be appreciated by reference to the following detailed description taken in conjunction with the drawings, wherein:

Figure 7:
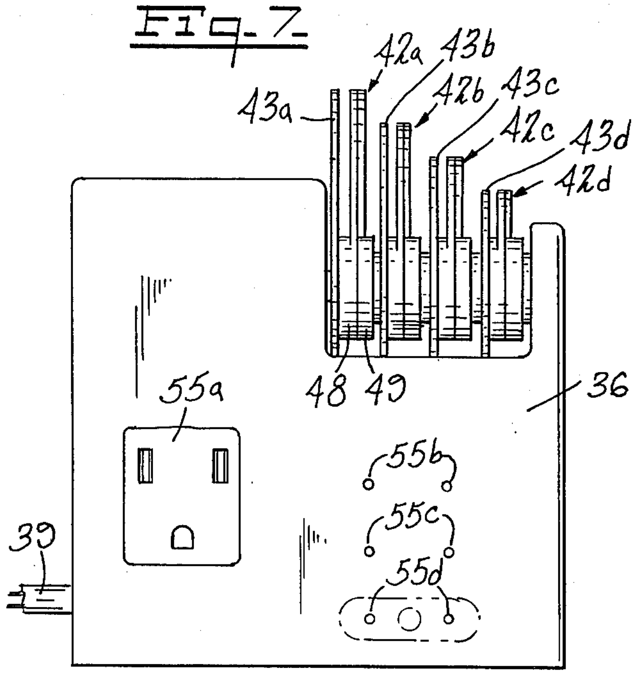
FIG. 7 is a side view of the housing of FIG. 2.
Figure 8A:
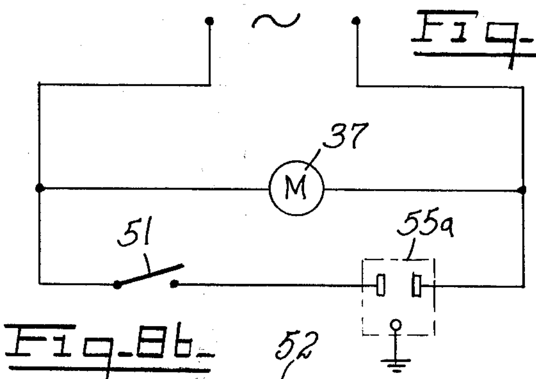
Figure 8B:
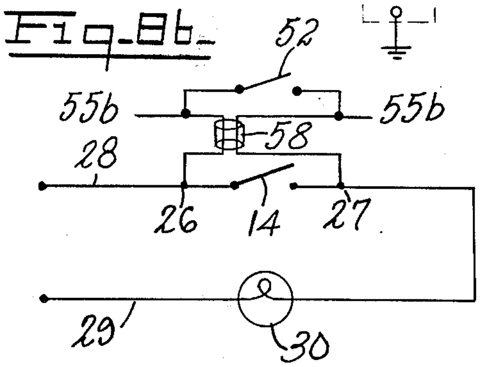
Figure 8C:
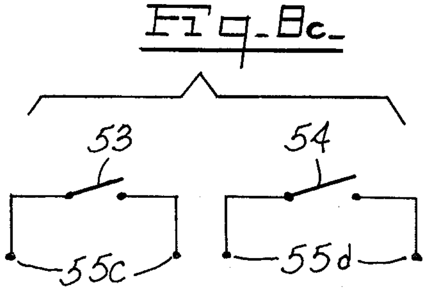

FIGS. 8*a* – 8*c* are sehematic diagrams of circuits in the apparatus of FIG. 7.

Figure 1:
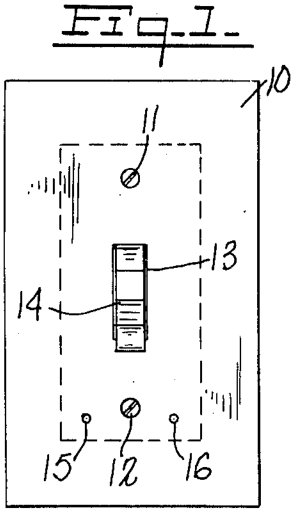
FIG. 1 is a front view of a wall box mounted switch embodying the invention.

Referring now to the drawings, FIG. 1 is a front view of a wall plate 10 embodying the invention. Such plate 10 has apertures therethrough for receiving mounting screws 11 and 12 and also an aperture 13 for receiving a switch-actuating toggle 14. Further defined in plate 10 are apertures 15 and 16 which are electric plug receptacles having connectors 17 in registry therewith as shown in FIG. 2.

Figure 2:
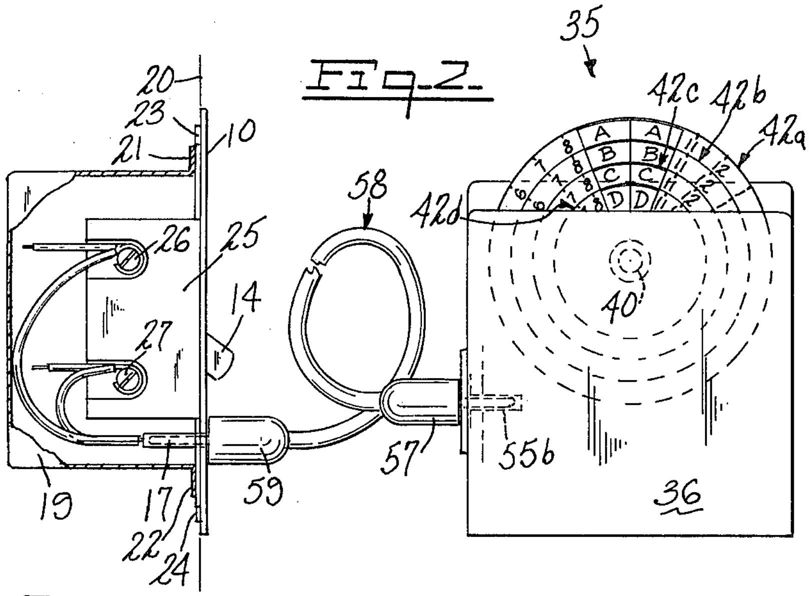
FIG. 2 is a side view of the switch of FIG. 1, partly cut away and further showing a timing device embodying the invention.
Figure 3:
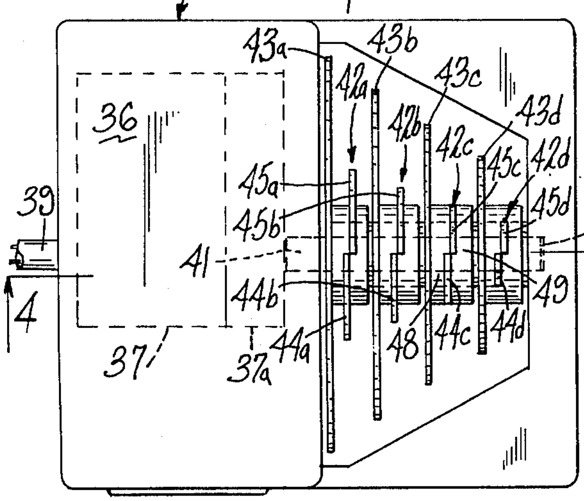
FIG. 3 is a top view of the timing device of FIG. 2.
Figure 4:
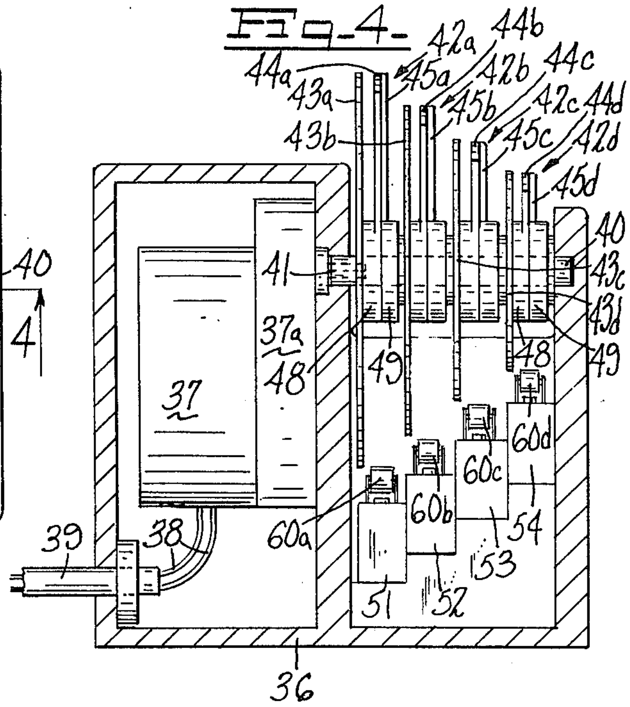
FIG. 4 is a view seen in the plane of lines 4—4 of FIG. 3.

As shown in FIG. 2 the plate 10 is mounted to a conventional electric wall box 19 which is substantially flush with the wall line 20. The wall box includes upper and lower lugs 21 and 22 which receive mounting screws (not shown in FIG. 2) therethrough from the upper and lower attachment arms 23 and 24 extending from a switch housing 25. The switch housing is of the conventional construction type having screw terminals 26 and 27 which are received in series in a line defined by leads 28 and 29 (FIG. 8). Upon actuation of the toggle 14, a switch either closes or opens an electric circuit between terminals 26 and 27 to complete a circuit to a lamp 30. The lamp 30 may be an outdoor post lamp, a front door lamp, or an overhead hall lamp, either ceiling mounted or wall mounted to its own wall box, but having no other means of control than the manually operated wall mounted switch.

A timing device 35 (FIGS. 2 – 4 and 7) is provided which includes a plurality of timing controls and switches. Such device comprises a housing 36 which includes a synchronous motor 37, preferably of the hysteresis type which through suitable leads 38 is connected to a conventional cord set 39 which will include a male plug adapted to be inserted into the conventional female wall receptacle.

Figure 5:
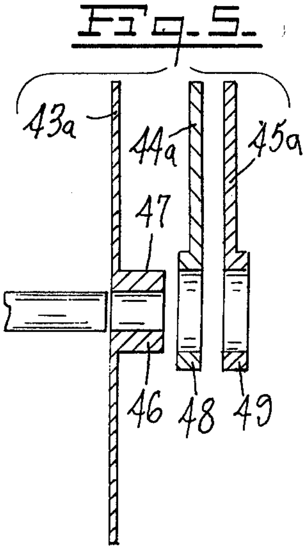
FIG. 5 is a side elevation in section of one of the timing devices of FIG. 4.
Figure 6:
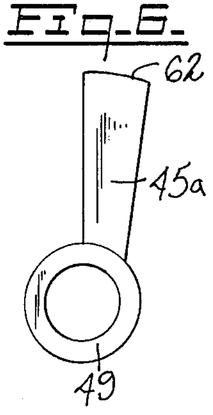
FIG. 6 is a front view of one of the timing cams of FIG. 5.

Motor 37 through suitable gearing (not shown) in a housing or gear box **37*a* drives a shaft 40 at clock speed, through a one-way clutch 41. The clutch may be incorporated in housing 36. The shaft 40 is geared to provide an output speed of one revolution per day. Shaft 40 drives at least one, and preferably two or more, cam sets 42 generally indicated at 42*a* – 42*d*. Each cam set consists of an hour indicator dial 43*a* – 43*d* and two adjustable cam switches 44*a* – 44*d* and 45*a* – 45*d* (see cam set 42*a*, FIGS. 5 and 6). Each hour indicator dial is divided into 24 segments as indicated in FIG. 2 to correspond to the hour of the day. Each hour dial on a multiple circuit embodiment of the invention is successively smaller in diameter from the back to front to permit access to the setting cams 44 and 45.**

The hubs 46 of the hour dial are press-fitted onto the shaft 40 and each of the hubs has an outer periphery 47. Each of the cams **44*a* and 45*a* have hubs 48 and 49, respectively, which are frictionally fitted over surface 47 of hubs 46. The fit between the hubs 48 and 49 on the periphery 47 of hub 46 is chosen to be of sufficient friction so that the cams may rotate with hub 46 when it is driven by shaft 40, but which will yield to finger pressure to permit the cams 44 and 45 to be set to a given hour. The cams of each cam set are arranged to actuate one of switches 51 (FIG. 8*a*), 52 (FIG. 8*b*), 53 and 54 (FIG. 8*c*). Each of the switches 52 – 54 has leads to a pair of contacts in the form of receptacles 55*b* – 55*d* carried on a sidewall of housing 36. In the embodiment as shown there will be three such pair of contacts 55*b*, 55*c*, 55*d*, each adapted to receive a male connection plug 57 as shown in FIG. 2. Connection plug 57 is part of a cord set generally indicated by the reference numeral 58 (FIG. 2) which includes another male plug 59 insertable into receptacles 15 and 16 on a wall plate 10. Optionally provided is a conventional female receptacle 55***a*, controlled by switch 51 (FIG. 8*a*), arranged to accept a common lamp or appliance plug.

Each of the cams 44 and 45 of a cam set has an outer periphery 62 formed on a radius and defined on an arc corresponding to a predetermined time interval on an hour dial, for example, one and one-half hours. Each of the cams is positioned and sized to actuate the roller 60*a* – 60*d* of one of switches 51 – 54. When the cam periphery holds the corresponding roller down, the switch is held in one of an open or closed position.

In the arrangement shown, a cord 58 is connected as, for example, between the cam controlled switch 52 and wall box 19 to control a lamp 30. The lamp 30 may be energized or de-energized through the toggle 14 in the normal manner, or the lamp may be energized and de-energized through the setting of the cams of a cam set 42*b* to a predetermined time interval or intervals. For example, the cams 44*b* and 45*b* of a cam set may be positioned so that they will maintain switch 52 closed continuously for any period from one and one-half to three hours or any two one and one-half hour periods interrupted by a period of time. If the cams are set together they will close their switches for only one and one-half hours. Then during such interval or intervals of time, the controlled lamp 30 will be illuminated. The housing 36 preferably has the cam sets mounted therein so as to provide easy access as shown in FIG. 2 and additionally the sides thereof may be opened as shown in FIG. 7 to facilitate access to the camming members of each cam set. The one-way clutch permits the hour dials to be correctly set at any time. Thereafter, the cams may be set to the desired times.

The timing device embodying the invention may be constructed with any desired number of cam sets and switches operated thereby. Provision will be provided for a similar number of receptacles 55.

All that is necessary to implement the invention will be the provision of a new cover plate having the receptacles 17 which are connectable to the terminal screws 26 and 27 of the existing switch, together with the provision of the housing member 36 and a cord set 58 for each lamp to be controlled.

The subtended angle of the peripheries 62 of each of the cams may be varied dependent upon the times of operation and need not be arranged to control equal times. The cams may be arranged for different time intervals of operation for a given cam set.

The invention provides an apparatus heretofore unavailable for permitting operation of lighting fixtures mounted to their own wall or ceiling boxes as well as outdoor post lamps, garage lamps, and front door lamps as well as any other type of lamp which is remotely controlled by a wall box mounted switch.

The connecting cords which consist of male plugs 57 on one end which connect to the timer switches and a male plug 59 on the other end which connect to the plate receptacle 17 could be of a two-part design. The cord sets 58 may be made in varying lengths so as to extend to variously located wall mounted switches from the common housing 36.

The wall plates may be the same as standard single gang switch plates except it would have the receptacles 15 and 16 carried thereby and lengths of the wires connectable to screw terminals 26 and 27 extending from the receptacles 15 and 16. Receptacles 15 and 16 may be carried in a member molded with the wall plate with the receptacle spaced sufficiently far apart to straddle the switch attachment arms 22 and 23. Alternatively the switch 25 and receptacles could be formed in fixed relation or constructed in an integral housing with the wall plate 10. Then the entire assembly will be mounted to box 19 in one operation.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. An electrical circuit timing assembly comprising a housing member, a timing drive means including a shaft supported on said housing, a plurality of time indicating means on said shaft each having a circular periphery and an axially extending hub, said indicating means being of progressively changing diameter, a camming member associated with each indicating means and normally in frictionally fixed relation with the hub thereof but angularly positionable thereon whereby each cammming member may be angularly positioned with respect to its associated indicating means, each of said camming members having a peripheral edge corresponding to a predetermined interval of time and a plurality of switches, each of said switches positioned on said housing to be actuated and held in an actuated position by a camming member of each indicating means, said drive means including shaft positioning means to permit said shaft and said indicating means thereon to be set to a given time position.

2. The assembly of claim 1 wherein a plurality of camming members are provided on each hub, said camming members being independently positionable with respect to each other.

* * * * *

UNITED STATES PATENT AND TRADEMARK OFFICE

CERTIFICATE OF CORRECTION

PATENT NO. : 3,988,553

DATED : October 26, 1976

INVENTOR(S) : Thomas W. Astle

It is certified that error appears in the above-identified patent and that said Letters Patent are hereby corrected as shown below:

On the title page, the assignee "Michael J. Cozy, Waterbury, Conn." should be changed to read --William E. Strakosch, Cheshire, Connecticut; and William F. Naylor, Ramsey, New Jersey--.

The title should read as follows: --TIMER SWITCH ASSEMBLY HAVING ADJUSTABLE CAMS AND CAM POSITION INDICATOR--.

Signed and Sealed this

Twelfth Day of April 1977

[SEAL]

*Attest:*

RUTH C. MASON
*Attesting Officer*

C. MARSHALL DANN
*Commissioner of Patents and Trademarks*